(12) United States Patent
Pyzik et al.

(10) Patent No.: US 6,951,686 B2
(45) Date of Patent: Oct. 4, 2005

(54) ARCHITECTURAL CONCRETE AND PROCESS TO MAKE SAME

(75) Inventors: Aleksander J. Pyzik, Midland, MI (US); Kenneth B. Stewart, Jr., Lake Jackson, TX (US); John M. Beckerdite, Lake Jackson, TX (US); Hari P. Reddy, Midland, MI (US); Uday V. Deshmukh, Oceanside, CA (US); Ted A. Morgan, Midland, MI (US); Sharon M. Allen, Midland, MI (US); Kwanho Yang, Midland, MI (US); Nicholas M. Shinkel, Bay City, MI (US); David F. Pawlowski, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 36 days.

(21) Appl. No.: 10/370,205

(22) Filed: Feb. 19, 2003

(65) Prior Publication Data

US 2003/0170439 A1 Sep. 11, 2003

Related U.S. Application Data

(63) Continuation of application No. 09/732,421, filed on Dec. 7, 2000, now abandoned.
(60) Provisional application No. 60/169,809, filed on Dec. 8, 1999.

(51) Int. Cl.[7] ................................................. D02G 3/00
(52) U.S. Cl. ..................... 428/375; 428/294.7; 428/357; 428/373; 428/374; 428/367; 428/297.1; 428/411.1; 106/724; 106/644; 264/333; 523/201; 524/4; 524/7; 524/8; 564/504
(58) Field of Search .......................... 564/504; 106/724, 106/644, 281; 428/375, 294, 7, 357, 373, 374, 367, 297.1, 411.1; 524/4, 7, 8; 523/201; 264/333

(56) References Cited

U.S. PATENT DOCUMENTS

| 3,305,528 | A |   | 2/1967  | Wynstra et al. ............... 260/47   |
| 4,199,366 | A | * | 4/1980  | Schaefer et al. ............... 524/4   |
| 4,316,925 | A | * | 2/1982  | Delmonte .................... 428/105   |
| 4,486,501 | A |   | 12/1984 | Holbek ........................ 428/375 |
| 4,657,954 | A | * | 4/1987  | Watanabe et al. ........... 523/459     |
| 5,114,653 | A |   | 5/1992  | Schuerhoff et al. ......... 264/228     |
| 5,173,115 | A | * | 12/1992 | Glynn. Jr. et al. ....... 106/281.1     |
| 5,399,195 | A | * | 3/1995  | Hansen et al. ............... 106/711   |
| 5,441,812 | A | * | 8/1995  | Modrak ....................... 428/359  |
| 5,624,980 | A | * | 4/1997  | Kobori .......................... 524/5 |
| 5,628,822 | A |   | 5/1997  | Hogan ........................ 106/802  |
| 5,686,181 | A |   | 11/1997 | Takano et al. .............. 428/367    |
| 5,753,368 | A | * | 5/1998  | Berke et al. ................. 428/375  |
| 5,780,582 | A |   | 7/1998  | Wang et al. ................. 528/365   |
| 5,814,373 | A | * | 9/1998  | White et al. ................. 427/386  |
| 5,834,078 | A | * | 11/1998 | Cavitt et al. ................ 428/35.7 |
| 5,852,163 | A | * | 12/1998 | Chen et al. .................. 528/274  |
| 5,993,537 | A | * | 11/1999 | Trottier et al. .............. 106/724  |
| 6,011,111 | A | * | 1/2000  | Brennan et al. ............. 524/601    |
| 6,020,063 | A |   | 2/2000  | Riffle et al. ................. 428/357 |
| 6,156,806 | A | * | 12/2000 | Piechocki et al. ............. 516/64   |
| 6,162,845 | A |   | 12/2000 | Freed ......................... 523/122 |
| 6,171,386 | B1 | * | 1/2001 | Sabins ........................ 106/724 |
| 6,207,600 | B1 | * | 3/2001 | Nakajima et al. ........... 442/311     |
| 6,407,225 | B1 | * | 6/2002 | Mang et al. .............. 536/123.1    |
| 6,569,233 | B2 | * | 5/2003 | Macklin et al. ............. 106/644    |
| 6,649,671 | B2 | * | 11/2003 | Pyzik et al. ................ 523/201   |

FOREIGN PATENT DOCUMENTS

| JP | 58-26071  | 2/1983  |
| JP | 60-51645  | 3/1985  |
| JP | 60-60960  | 4/1985  |
| JP | 7-300773  | 11/1995 |

OTHER PUBLICATIONS

T. Takata, et al.; *Polymers in Concrete*; Influence of Polymer Species and Additives on High–Strength Polymer–Cement Composite; pp. 503–510.

* cited by examiner

*Primary Examiner*—Rena Dye
*Assistant Examiner*—Tamra L. Dicus

(57) ABSTRACT

A concrete article comprised of concrete having therein a reinforcing polymer that has a surface comprised of a thermoplastic hydroxy-functionalized polyether or polyester. The concrete article is made by mixing concrete, water and a reinforcing polymer that has a surface comprised of a thermoplastic hydroxy-functionalized polyether or polyester and curing said concrete mixture forming the concrete article.

24 Claims, No Drawings

ARCHITECTURAL CONCRETE AND PROCESS TO MAKE SAME

This application is a continuation of prior U.S. application Ser. No. 09/732,421 filed Dec. 7, 2000, now abandoned, which claims priority from U.S. provisional application No. 60/169,809 filed Dec. 8, 1999.

FIELD OF THE INVENTION

The invention relates to architectural concrete and methods of forming it. In particular, the invention relates to concrete containing plastic fibers.

BACKGROUND OF THE INVENTION

Generally, concrete is a brittle material with high compressive strength but low tensile strength. In the concrete industry, all concrete work is typically specified on the basis of the compressive strength. Any attempt to improve the crack strength (tensile strength) and toughness of the concrete almost always requires the introduction of reinforcing addition. For example, rebar (steel rods) is added, which provides structural integrity but does not eliminate cracking. Metal mesh has also been added to reduce cracking but it cannot be used effectively to reinforce concrete of complex geometry.

Plastic fibers have also been used to improve the tensile strength and toughness (resistance to cracking). However, the addition of synthetic polymer fibers almost always causes a reduction in the compressive strength. In addition, when plastic fibers are used, they tend to only improve either the tensile strength (strength before the first crack appears) or the toughness (resistance to cracking), but not both at the same time.

Also, the addition of polymer fibers almost always worsens the workability of the concrete mix, resulting in (i) a practical upper limit for fiber volume/loading (typically about 0.3 volume percent) and (ii) increased difficulties with transporting concrete slurries for use in applications requiring shotcreting (sprayed concrete). The addition of extra water to improve workability reduces the mechanical properties of cured concrete and increases the tendency to form cracks due to shrinkage upon curing. To alleviate these problems, superplasticizer has been added to reduce the water content, but these invariably increase the cost and the slump (i.e., flow) of the concrete after it is applied. As a result, suitable concrete formulations for shotcrete applications suffer from either poor mechanical properties, insufficient workability or greatly increased cost.

Accordingly, it would be desirable to provide a concrete formulation, for example, that improves one or more of the problems of the prior art, such as improving the tensile strength, toughness and workability, while not decreasing the compressive strength described above.

SUMMARY OF THE INVENTION

We have now discovered a new type of concrete that has improved plasticity, cohesion, and ability to form objects having complex geometry without post (or plastic) shrinkage cracking. The concrete of this invention has a viscosity low enough to be easily transported (pumped) and applied (sprayed or cast) and, after application, its viscosity increases rapidly to produce a clay-like material (texture), which can be readily shaped and molded. Even though this concrete does not contain expensive additives, such as those used in fast-setting compositions, it cures quickly to provide, for example, a one-day compressive strength that is 50–100 percent higher than that of regular concrete. In addition, it improves first crack strength, compressive strength and toughness of the concrete after curing. Finally, and most surprisingly, this new reinforced concrete may have increased compressive strength compared to non-reinforced concrete.

This concrete has been surprisingly obtained by adding, to the concrete, a reinforcing polymer that has a surface comprised of a thermoplastic hydroxy-functionalized polyether or polyester, as further described by the following aspects of the invention.

A first aspect of the invention is a concrete article comprised of concrete having therein a reinforcing polymer that has a surface comprised of a thermoplastic hydroxy-functionalized polyether or polyester.

A second aspect of the invention is a process to make concrete comprised of mixing concrete, water and a reinforcing polymer that has a surface comprised of a thermoplastic hydroxy-functionalized polyether or polyester and curing said concrete mixture to form the concrete article.

A third aspect of the invention is a concrete article formed by the process of the second aspect.

The concrete of this invention may be used in any application suitable for concrete, but it is especially well-suited for architectural purposes, such as landscaping stones, modern architecture, art sculptures, fast setting/non-slumping ceilings, swimming pools, concrete prefab panels and for repairing and retrofitting existing structures.

DETAILED DESCRIPTION OF THE INVENTION

The concrete used to form the concrete article of this invention may be any suitable concrete, such as those known in the art. Generally, the concrete is a mixture comprised of Portland cement. Portland cement is used as is commonly understood in the art and defined by *Hawley's Condensed Chemical Dictionary*, $12^{th}$ Ed., R. Lewis, Van Nostrand Co., NY, p. 239, 1993.

It is understood that the reinforcing polymer in the concrete is a solid at ambient conditions. That is to say, the polymer is added as a solid object and is a solid after the concrete is cured. The polymer may be any shape useful in making the concrete article. Preferably, the polymer is a fiber, bundles of fibers, sheets, ribbons (e.g., sheets that are slit) or combinations thereof. More preferably, the reinforcing polymer is a fiber or ribbon. Most preferably, the reinforcing polymer is fiber as described herein. Desirably, the reinforcing polymer is uniformly distributed within the concrete.

The amount of reinforcing polymer in the concrete generally ranges from about 0.01 volume percent to about 10 volume percent of the concrete article. Preferably, the amount of the reinforcing polymer is at least about 0.02 percent, more preferably at least about 0.025 percent and most preferably at least about 0.1 percent, to preferably at most about 7 percent, more preferably at most about 3 percent and most preferably at most about 1 percent by volume of the article.

The polymer may be any polymer so long as the polymer has a surface (surface or sheath polymer) that is comprised of a thermoplastic hydroxy-functionalized polyether or polyester. Needless to say, the polymer may be entirely comprised of a thermoplastic hydroxy-functionalized polyether or polyester, but it is preferred that the polymer is comprised of a core that is a polymer (core polymer), other than the thermoplastic hydroxy-functionalized polyether or polyester described below.

The surface polymer may cover any portion of the core polymer sufficient to impart one or more of the desirable properties described previously. Generally, at least about 1 percent of the surface of a core polymer is comprised of the surface polymer.

The thermoplastic hydroxy-functionalized polyether or polyester generally is one that is prepared by the reaction of a dinucleophilic monomer with a diglycidyl ether, a diglycidyl ester or epihalohydrin. Examples of useful thermoplastic hydroxy-functionalized polyether include those described in PCT/US99/25613.

Preferably, the thermoplastic hydroxy-functionalized polyether or polyester is selected from the group consisting of:

(1) poly(hydroxy ester ethers) or poly(hydroxy esters) having repeating units represented by the formula:

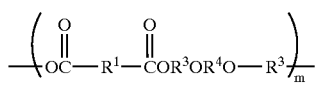

I (2) polyetheramines having repeating units represented by the formula:

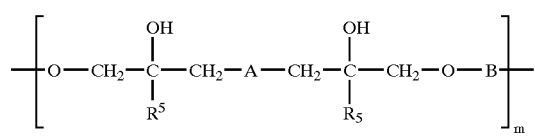

II (3) hydroxy-functionalized polyethers having repeating units represented by the formula:

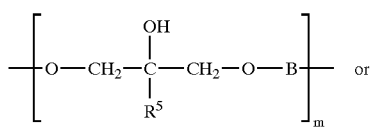

III or (4) hydroxy-functionalized poly(ether sulfonamides) having repeating units represented by the formula:

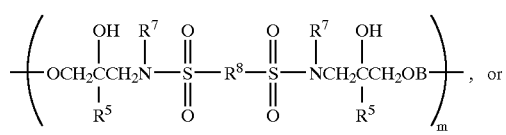

IVa or

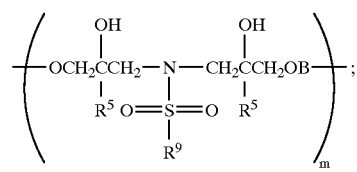

IVb wherein R1 is a divalent organic moiety which is primarily hydrocarbon; R2 is independently a divalent organic moiety which is primarily hydrocarbon; R3 is

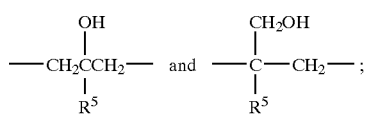

R4 is

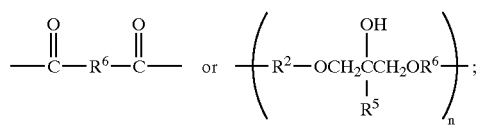

R5 is hydrogen or alkyl; R6 is a divalent organic moiety which is primarily hydrocarbon; R7 and R9 are independently alkyl, substituted alkyl, aryl, substituted aryl; R8 is a divalent organic moiety which is primarily hydrocarbon; A is an amine moiety or a combination of different amine moieties; B is a divalent organic moiety which is primarily hydrocarbon; m is an integer from 5 to 1000; and n is an integer from 0 to 100.

In the preferred embodiment of the present invention, A is 2-hydroxyethylimino-, 2-hydroxypropyl-imino-piperazenyl, N,N'-bis(2-hydroxyethyl)-1,2-ethylenediimino; and B and R1 are independently 1,3-phenylene, 1,4-phenylene; sulfonyldiphenylene, oxydiphenylene, thiodiphenylene or isopropylidene-diphenylene; R5 is hydrogen; R7 and R9 are independently methyl, ethyl, propyl, butyl, 2-hydroxyethyl or phenyl; and B and R8 are independently 1,3-phenylene, 1,4-phenylene, sulfonyldiphenylene, oxydiphenylene, thiodiphenylene or isopropylidenediphenylene.

The poly(hydroxy ester ethers) represented by Formula I are prepared by reacting diglycidyl ethers of aliphatic or aromatic diacids, such as diglycidyl terephthalate, or diglycidyl ethers of dihydric phenols with aliphatic or aromatic diacids, such as adipic acid or isophthalic acid. These polyesters are described in U.S. Pat. No. 5,171,820. Alternatively, the poly(hydroxyester ethers) are prepared by reacting a diglycidyl ester with a bisphenol or by reacting a diglycidyl ester, diglycidyl ether or an epihalohydrin with a dicarboxylic acid.

The polyetheramines, represented by Formula II, are prepared by contacting one or more of the diglycidyl ethers of a dihydric phenol with an amine having two amine hydrogens, under conditions sufficient to cause the amine moieties to react with epoxy moieties to form a polymer backbone having amine linkages, ether linkages and pendant hydroxyl moieties. These polyetheramines are described in U.S. Pat. No. 5,275,853. The polyetheramines can also be prepared by contacting a diglycidyl ether or an epihalohydrin with a difunctional amine.

The hydroxy-functionalized polyethers represented by Formula III are prepared, for example, by contacting an epihalohydrin or a diglycidyl ether with a bisphenol. These polymers are described in U.S. Pat. No. 5,496,910.

The hydroxy-functionalized poly(ether sulfonamides) represented by Formulae IVa and IVb are prepared, for example, by polymerizing an N,N'-dialkyl or N,N'-diaryldisulfonamide with a diglycidyl ether as described in U.S. Pat. No. 5,149,768.

The hydroxy-functionalized polyethers, commercially available from Phenoxy Associates, Inc., are also suitable for use in the present invention. These hydroxy-functionalized polyethers are the condensation reaction products of a dihydric polynuclear phenol, such as bisphenol A, and an epihalohydrin (or diglycidyl ether) and have the repeating units represented by Formula I, wherein Ar is an isopropylidene diphenylene moiety. These hydroxyphenoxyether polymers and the process for preparing them are described in U.S. Pat. No. 3,305,528.

The polymers which are not hydroxy-functionalized polyesters or polyethers, which can be employed in the practice of the present invention, for example, for preparing the cores of fibers include polyolefins, polyesters, polyamides, polyethers, polysaccharides, modified polysaccharides or naturally-occurring fibers or particulate fillers; thermoplastic polyurethanes, thermoplastic elastomers and glycol-modified copolyester (PETG). Other polymers of the polyester or polyamide-type can also be employed in the practice of the present invention for preparing the fiber. Such polymers include polyhexamethylene adipamide, polycaprolactone, polyhexamethylene sebacamide, polyethylene 2,6-naphthalate and polyethylene 1,5-naphthalate, polytetramethylene 1,2-dioxybenzoate and copolymers of ethylene terephthalate and ethylene isophthalate.

The polyesters and methods for their preparation are well-known in the art and reference is made thereto for the purposes of this invention. For purposes of illustration and not limitation, reference is particularly made to pages 1–62 of Volume 12 of the *Encyclopedia of Polymer Science and Engineering*, 1988 revision, John Wiley & Sons.

The polymers, which are not hydroxy-functionalized polyesters or polyethers, can be blended with the hydroxy-functionalized polyether or polyester at levels of less than 50 weight percent and, preferably, less than 30 weight percent, based on the weight of the fiber. These other polymers can be blended into the hydroxy-functionalized polyether or polyester in order to reduce composition cost, to modify physical properties, barrier or permeability properties, or adhesion characteristics.

The polyamides, which can be employed in the practice of the present invention for preparing the fibers, include the various grades of nylon, such as nylon 6, nylon 6,6 and nylon 12.

By the term "polyolefin" is meant a polymer or copolymer derived from simple olefin monomers, such as ethylene, propylene, butylene, isoprene, and the like and one or more monomers copolymerizable therewith. Such polymers (including raw materials, their proportions, polymerization temperatures, catalysts and other conditions) are well-known in the art and reference is made thereto for the purpose of this invention. Additional comonomers, which can be polymerized with ethylene, include olefin monomers having from 3 to 12 carbon atoms, ethylenically unsaturated carboxylic acids (both mono- and difunctional) and derivatives of such acids, such as esters (for example, alkyl acrylates) and anhydrides; monovinylidene aromatics and monovinylidene aromatics substituted with a moiety other than halogen, such as styrene and methylstyrene; and carbon monoxide. Exemplary monomers, which can be polymerized with ethylene, include 1-octene, acrylic acid, methacrylic acid, vinyl acetate and maleic anhydride.

The polyolefins, which can be employed in the practice of the present invention for preparing the core polymer, such as in fibers, include polypropylene, polyethylene, and copolymers and blends thereof, as well as ethylene-propylene-diene terpolymers. Preferred polyolefins are polypropylene, linear high density polyethylene (HDPE), heterogeneously-branched linear low density polyethylene (LLDPE), such as DOWLEX polyethylene resin (a trademark of The Dow Chemical Company), heterogeneously-branched ultra low linear density polyethylene (ULDPE), such as ATTANE ULDPE (a trademark of The Dow Chemical Company); homogeneously-branched, linear ethylene/α-olefin copolymers, such as TAFMER (a trademark of Mitsui Petrochemicals Company Limited) and EXACT (a trademark of Exxon Chemical Company); homogeneously branched, substantially linear ethylene/α-olefin polymers, such as AFFINITY (a trademark of The Dow Chemical Company) and ENGAGE (a trademark of DuPont Dow Elastomers L.L.C.) polyolefin elastomers, which can be prepared as disclosed in U.S. Pat. Nos. 5,272,236 and 5,278,272; and high pressure, free radical polymerized ethylene polymers and copolymers, such as low density polyethylene (LDPE), ethylene-acrylic acid (EAA) copolymers, such as PRIMACOR (trademark of The Dow Chemical Company), and ethylene-vinyl acetate (EVA) copolymers, such as ESCORENE polymers (a trademark of Exxon Chemical Company), and ELVAX (a trademark of E.I. du Pont de Nemours & Co.). The more preferred polyolefins are the homogeneously-branched linear and substantially linear ethylene copolymers with a density (measured in accordance with ASTM D-792) of 0.85 to 0.99 gram per cm$^3$, a weight average molecular weight to number average molecular weight ratio (Mw/Mn) from 1.5 to 3.0, a measured melt index (measured in accordance with ASTM D-1238 (190/2.16)) of 0.01 to 100 grams per 10 minutes, and an I10/I2 of 6 to 20 (measured in accordance with ASTM D-1238 (190/10)).

In general, high density polyethylene (HDPE) has a density of at least about 0.94 gram per cubic centimeter (gram per cc) (ASTM Test Method D-1505). HDPE is commonly produced using techniques similar to the preparation of linear low density polyethylenes. Such techniques are described in U.S. Pat. Nos. 2,825,721; 2,993,876; 3,250,825 and 4,204,050. The preferred HDPE employed in the practice of the present invention has a density of from 0.94 to 0.99 gram per cc and a melt index of from 0.01 to 35 grams per 10 minutes as determined by ASTM Test Method D-1238.

The polysaccharides, which can be employed in the practice of the present invention, are the different starches, celluloses, hemicelluloses, xylanes, gums, pectins and pullulans. Polysaccharides are known and are described, for example, in *Encyclopedia of Polymer Science and Technology*, 2nd edition, 1987. The preferred polysaccharides are starch and cellulose.

The modified polysaccharides, which can be employed in the practice of the present invention, are the esters and ethers of polysaccharides, such as, for example, cellulose ethers and cellulose esters, or starch esters and starch ethers. Modified polysaccharides are known and are described, for example, in *Encyclopedia of Polymer Science and Technology*, 2nd edition, 1987.

The term "starch" as used herein, refers to carbohydrates of natural vegetable origin, composed mainly of amylose and/or amylopectin, and includes unmodified starches, starches, which have been dewatered but not dried, physically modified starches, such as thermoplastic, gelatinized or cooked starches, starches with a modified acid value (pH), where acid has been added to lower the acid value of a starch to a range of from 3 to 6, gelatinized starches, ungelatinized starches, cross-linked starches and disrupted starches (starches which are not in particulate form). The starches can be in granular, particulate or powder form. They can be extracted from various plants, such as, for example, potatoes, rice, tapioca, corn, pea, and cereals, such as rye, oats, and wheat.

Celluloses are known and are described, for example, in *Encyclopedia of Polymer Science and Technology*, 2nd edition, 1987. Celluloses are natural carbohydrate high polymers (polysaccharides) consisting of anhydroglucose units joined by an oxygen linkage to form long molecular chains that are essentially linear. Cellulose can be hydrolyzed to form glucose. The degree of polymerization ranges from 1000 for wood pulp to 3500 for cotton fiber, giving a molecular weight of from 160,000 to 560,000. Cellulose can be extracted from vegetable tissues (wood, grass, and cotton). Celluloses can be used in the form of fibers.

Naturally-occurring fibers or particulate fillers that may be employed in the practice of the present invention are, for example, wood flour, wood pulp, wood fibers, cotton, flax, hemp, or ramie fibers, rice or wheat straw, chitin, chitosan, cellulose materials derived from agricultural products, nut shell flour, corn cob flour, and mixtures thereof.

In general, the polymer of the invention, when it is a fiber, should contain at least 1 weight percent of the epoxy component (surface polymer). A bi-component fiber with a sheath layer and a core is a preferred solution; however, blending of different polymers and extruding this blend into fiber form is also an acceptable processing route. The sheath layer should consist of at least 50 percent epoxy and a core material can be PP, PE, PET, nylon, etc. It is preferable that grafted PP core is used. A sheath layer should cover at least 10 percent of the core surface. The ratio of sheath to core (measured from fiber cross-section) ranges from 1:99 to 60:40 and preferably from 5:95 to 20:80. The epoxy can be poly(hydroxy amino ether) (PHAE) with a melting index from 5 to 40 and density from 1.05 grams per cc to 1.35 grams per cc. The most preferred composition consists of a melting index of 8 and a density of 1.2 grams per cc.

In general, when a fiber is used in the present invention, the fibers may be formed by well-known processes such as melt spinning, wet spinning, or conjugate spinning. The fibers of the present invention may be extruded into any size, or length desired. They may also be extruded into any shape desired, such as, for example, cylindrical, cross-shaped, trilobal or ribbon-like cross-section.

The preferred bicomponent fibers useful in the present invention may have the following fiber cross-section structures:

(1) Side-by-side
(2) Sheath-core
(3) Islands-in-the sea and
(4) Citrus (Segmented pie)

Side-by-side

A method for producing side-by-side bicomponent fibers is described in U.S. Pat. No. 5,093,061, which is incorporated herein by reference. The method comprises (1) feeding two polymer streams through orifices separately and converging at substantially the same speed to merge side-by-side as a combined stream below the face of the spinneret; or (2) feeding two polymer streams separately through orifices, which converge at the surface of the spinneret, at substantially the same speed to merge side-by-side as a combined stream at the surface of the spinneret. In both cases, the velocity of each polymer stream at the point of merge is determined by its metering pump speed and the size of the orifice. The fiber cross-section has a straight interface between two components.

Side-by-side fibers are generally used to produce self-crimping fibers. All commercially available self-crimping fibers are produced by using a system based on the different shrinkage characteristics of each component.

Sheath-core

Sheath-core bicomponent fibers are those fibers where one of the components (core) is fully surrounded by a second component (sheath). Adhesion is not always essential for fiber integrity.

The most common way to produce sheath-core fibers is a technique in which two polymer liquids (melts) are separately led to a position very close to the spinneret orifices and then extruded in sheath-core form. In the case of concentric fibers, the orifice supplying the "core" polymer is in the center of the spinning orifice outlet and flow conditions of core polymer fluid are strictly controlled to maintain the concentricity of both components when spinning. Modifications in spinneret orifices enable one to obtain different shapes of core and/or sheath within the fiber cross-section.

The sheath-core structure is employed when it is desirable for the surface to have the property of one of the polymers, such as luster, dyeability or stability, while the core may contribute to strength, reduced cost and the like. The sheath-core fibers are used as crimping fibers and as bonding fibers in the non-woven industry.

Desirably, the hydroxy-functionalized polyether or polyester is the sheath and the polymer that is not the hydroxy-functionalized polyether or polyester is the core of the bicomponent fiber.

Methods for producing sheath-core bicomponent fibers are described in U.S. Pat. Nos. 3,315,021 and 3,316,336, both of which are incorporated herein by reference.

Islands-in the-sea

Islands-in-the sea fibers are also called matrix-filament fibers, which include heterogeneous bicomponent fibers. A method for producing islands-in-the sea fibers is described in U.S. Pat. No. 4,445,833, incorporated herein by reference. The method comprises injecting streams of core polymer into sheath polymer streams through small tubes with one tube for each core stream. The combined sheath-core streams converge inside the spinneret hole and form one island-in-the sea conjugate stream.

Mixing the different polymer streams with a static mixer in the spinning process also makes island-in-the-sea bicomponent fibers. The static mixer divides and redivides the polymer stream to form a matrix stream with multiple cores. This method for producing island-in-the-sea fibers is described in U.S. Pat. No. 4,414,276, which is incorporated herein by reference.

The hydroxy-functionalized polyether or polyester can be the sea polymer and the polymer, which is not a hydroxy-functionalized polyether or polyester, can be the island polymer. The hydroxy-functionalized polyether or polyester can also be the island polymer and the polymer, which is not a hydroxy-functionalized polyether or polyester, the sea polymer.

The islands-in-the-sea structure is employed when it is desirable to increase the modulus of the fiber, reduce moisture regain, reduce dyeability, improve the texturing capability or give the fiber a unique lustrous appearance.

Citrus Type (Segmented Pie)

The citrus type bicomponent or segmented pie bicomponent fibers can be made by polymer distribution and/or spinneret modifications of the pack assemblies employed in the methods described above for producing the side-by-side, sheath-core or islands-in-the-sea fibers. For example, by introducing a first polymer stream and a second polymer stream alternately through eight radial channels toward the spinneret hole instead of two channels, the resultant fiber is an eight-segment citrus type fiber. If the spinneret orifice has the configuration of three or four slots on a circle (a common orifice configuration to produce hollow fibers), the fiber is a hollow citrus type fiber with eight segments. The hollow citrus type fiber can also be made by the use of special spinneret orifice configurations with a sheath-core spin pack as described in U.S. Pat. Nos. 4,246,219 and 4,357,290, both of which are incorporated herein by reference.

The concrete article may be made by mixing the reinforcing polymer, water and concrete in any suitable manner. Preferably the concrete dry components (e.g., cement sand and gravel) are dry mixed first and then water is mixed to make a wet mixture. Subsequently, the reinforcing polymer is mixed with the wet mixture. This mixture is then cast, shotcreted or molded or dispensed by any suitable method, such as those known in the art.

To the mixture, other additives useful in the formation of concrete may be added, such as polymeric emulsion of styrene-butadiene, epoxy, polyurethane, and ethylene-styrene and synthetic polymer emulsions of the polymers described herein. In addition, other components may be added such as steel (e.g., rebar), polymers other than those that contain the thermoplastic hydroxy-functionalized polyether or polyester (e.g., polypropylene fibers).

EXAMPLES

Polymer fibers used in Example 1 were made as follows. The fibers were produced at Hills Inc. (West Melbourne, Fla.) using commercially available melt spinning equipment. All of the fibers made had a sheath/core trilobal shape. Sheath/core fibers were fabricated with a ratio of sheath to core ranging from 10:90 to 30:70. The conditions of the extrusion were adjusted depending on the combination of polymers and their characteristics. For example, the conditions to fabricate PHAE sheath-polypropylene core fibers were as follows:

| Extrusion temperatures, ° C. | | |
|---|---|---|
| Zone 1 | 185 | 200 |
| Zone 2 | 200 | 210 |
| Zone 3 | 200 | 220 |
| Zone 4 | 210 | 230 |
| Melt | | 225 |
| Extruder Pressure | 750 psi | 750 |
| Speed of denier roll, rpm | | 200 |
| Speed of tension roll | | 200 |
| Draw ratio | | 4:1 |
| Temp on denier roll | | 100° C. |
| Quench temp, ° F. | | 65° F. |

Example 1
Concrete Article Reinforced with Fibers

A concrete mixture was prepared by blending 15.90 percent Portland cement (Holnan Type 1), 60.85 percent sand (C-109 type), 21.17 percent tap water, 0.81 percent super-plastisizer (assuming 40 percent solids-WRDA-19 from W. R. Grace) and 0.85 volume percent polymer fibers. The mass ratio of water to cement was 0.4, sand to cement 2.75, and fibers to cement 0.015.

The fibers were a bi-component fiber having 80 percent polypropylene core and 20 percent PHAE resulting from the reaction of the diglycidyl ether of bisphenol A and ethanolamine. The fibers were a trilobal monofilament shape made by the method described above. The properties of the fiber were as follows: denier of about 2070 grams, tenacity of about 2.3 grams per denier.

The dry ingredients were first added and then water was added to make a base mixture. Fibers that were 0.75 inch (1.90 cm) long were added to the base mixture. The total mixing time was about 5 minutes. The obtained paste was placed into 2 inch (5.08 cm) by 2 inch (5.08 cm) by 12 inch (30.48 cm) long molds and cured in a water bath at a constant temperature of 20° C. for 7 days and 28 days. After 7 days and 28 days, the concrete bars were tested in a 4-point bend test. After 1, 7 and 28 days of cure, the bars were tested for compressive strength.

The bars, after 7 days cure, had an average first crack strength of 920 psi. The bars, after 28 days cure, had an average bend strength of about 1081 psi and a toughness of about 15 lb.-in (1.695 joules). The compressive strength of the bars after 1, 7 and 28 days of curing was 4300 psi, 7240 psi and 8520 psi.

Comparative Example 1

Concrete bars, without fibers, were made in the same way as described in Example 1. The results for these bars were as follows. The average first crack bend strength, after 7 days cure, was 850 psi. Average first crack bend strength, after 28 days of curing, was 944 psi and the toughness was about 1 lb.-in (0.113 joules). The compressive strength of the bars after 1, 7 and 28 days of curing was 2090 psi, 5760 psi and 8200 psi.

Comparative Example 2

Concrete bars were made in the same way as in Example 1, except that the fibers were commercial polypropylene fibers from Synthetic Industries (Chattanooga, Tenn.). The fiber was about 18 mm in length, had a cross-section of about 50 by 100 microns and a tenacity of about 4.5 grams per denier. The average first crack bend strength, after the 7-day cure, was about 350 psi. The average first crack bend strength, after 28 days of curing, was about 560 psi and the toughness was about 12 lb-in (1.356 joules). The compressive strength of the bars after 1, 7 and 28 days of curing was 1670 psi, 4260 psi and 5770 psi.

Comparative Example 3

Concrete bars were made in the same way as in Example 1, except that the fibers were commercial polypropylene fibers from Forta Corp. (Grove Cite, Pa.). The fiber was about 18 mm in length. The average first crack bend strength, after the 7-day cure, was about 350 psi. The average first crack bend strength, after 28 days of curing, was about 560 psi and the toughness was about 12 lb-in (1.356 joules). The compressive strength of the bars after 1, 7 and 28 days of curing was 2550 psi, 4970 psi and 6960 psi.

Example 2

The shrinkage testing of a concrete article of this invention was performed as described by Banthia, N., et al., "Restrained Shrinkage Cracking In Fiber Reinforced Concrete: A Novel Test Techique," *Cement and Concrete Research*, pp. 9–14, vol. 26, No. 1 (1996). The concrete article was fashioned from fibers made in similar fashion as in Example 1, except that the fibers had a circular cross-section, denier per filament of 6 to 7, length of about 18 mm and a tenacity of about 2.5 to 3 grams per filament.

The composition of the concrete was 28.2 percent by weight cement, 28.2 percent by weight 2NS sand, 28.2 percent by weight aggregate having a diameter of about 25 mm, 15.4 percent by weight water and 0.1 percent by volume of fibers. The composition of the concrete base used to test the concrete of this example consisted of 5400 grams of cement, 600 grams of fumed silica, 7344 grams of 2NS sand, 7344 grams of aggregate (about 25 mm in diameter), 2106 grams of water and 16.2 grams of RHEOBUILD superplasticizer (Masterbuilders Technologies Inc., Cleveland, Ohio). During the first 24 hours of curing, the concrete was digitally photographed each hour and the total crack area determined using an Image-Pro Version 4 image analysis software available from Media Cybernetics (Silver Spring, Md.). The concrete had no shrinkage cracking after 24 hours.

Comparative Example 4

A concrete article was made in the same way as Example 2, except that the concrete article had STEALTH polypropylene fibers obtained from Synthetic Industries (Chattanooga, Tenn.). These fibers had the same denier, shape and length as the fibers in Example 2. The total shrinkage cracking area after 24 hours was 113 square millimeters (mm$^2$).

Comparative Example 5

A concrete article for shrinkage testing was made in the same way as Example 2, except that no fibers were used. The total shrinkage cracking after 24 hours was 275 mm$^2$.

What is claimed is:

1. A concrete article comprised of concrete having therein a reinforcing organic polymer fiber, sheet or ribbon that has a surface comprised of a thermoplastic hydroxy-functionalized polyether or polyester wherein the reinforcing polymer is comprised of a blend of the hydroxy-functionalized polyether or polyester with a polyolefin, polyester, polyamide, polysaccharide, modified polysaccharide, naturally-occurring fiber, particulate filler, thermoplastic polyurethane, thermoplastic elastomer, glycol-modified copolyester (PETG) or combination thereof.

2. The concrete article of claim 1 wherein the thermoplastic hydroxy-functionalized polyether or polyester is prepared by the reaction of a dinucleophilic monomer with a diglycidyl ether, a diglycidyl ester or epihalohydrin.

3. The concrete article of claim 1 wherein the hydroxy-functionalized polyether or polyester is selected from the group consisting of:

(1) poly(hydroxy ethers) or poly(hydroxy esters) having repeating units represented by the formula:

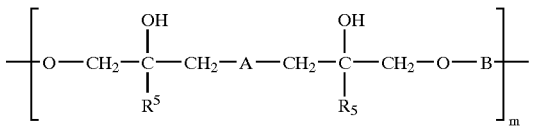

I (2) polyetheramines having repeating units represented by the formula:

II

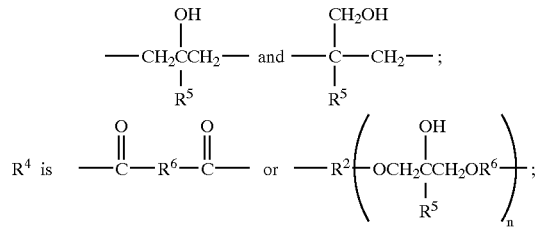

(3) hydroxy-functionalized polyethers having repeating units represented by the formula:

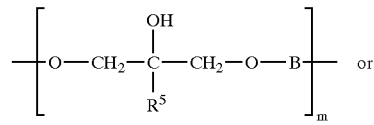

III (4) hydroxy-functionalized poly(ether sulfonamides) having repeating units represented by the formula:

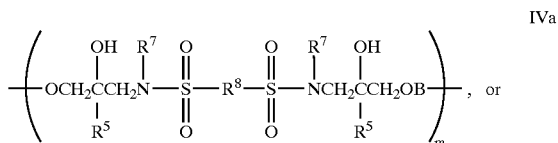

IVa

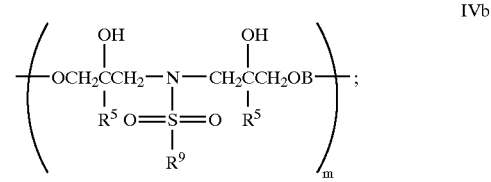

IVb wherein $R^1$ is a divalent organic moiety, which is primarily hydrocarbon; $R^2$ is independently a divalent organic moiety, which is primarily hydrocarbon; $R^3$ is

$R^4$ is $R^5$ is hydrogen or alkyl; $R^6$ is a divalent organic moiety, which is primarily hydrocarbon; $R^7$ and $R^9$ are independently alkyl, substituted alkyl, aryl, substituted aryl; $R^8$ is a divalent organic moiety, which is primarily hydrocarbon; A is an amine moiety or a combination of different amine moieties; B is a divalent organic moiety, which is primarily hydrocarbon; m is an integer from 5 to 1000; and n is an integer from 0 to 100.

4. The concrete article of claim 3 wherein the hydroxy-functionalized polyether or polyester is the polyetheramines, hydroxy-functionalized poly(ether sulfonamides) or combination thereof.

5. The concrete article of claim 4, wherein the hydroxy-functionalized polyether or polyester is the polyetheramines.

6. The concrete articles of claim 1 wherein the reinforcing polymer is a bicomponent fiber having (1) a first component comprising a thermoplastic hydroxy-functionalized polyether or polyester or a blend of a hydroxy-functionalized polyether or polyester and (2) a second component comprising a polyolefin, polyester, polyamide, polysaccharide, modified polysaccharide or naturally-occurring fiber, particulate filler, thermoplastic polyurethane, thermoplastic elastomer or glycol-modified copolyester (PETG).

7. The concrete article of claim 6 wherein the hydroxy-functionalized polyether or polyester is prepared by the reaction of a dinucleophilic monomer with a diglycidyl ether, a diglycidyl ester or epihalohydrin.

8. The concrete article of claim 6 wherein the hydroxy-functional polyether is selected from the group consisting of:

(1) poly(hydroxy ethers) or poly(hydroxy esters) having repeating units represented by the formula:

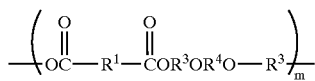
I (2) polyetheramines having repeating units represented by the formula:

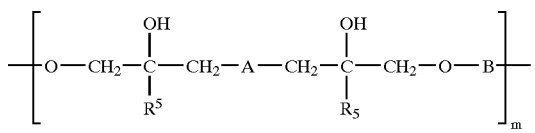
II (3) hydroxy-functionalized polyethers having repeating units represented by the formula:

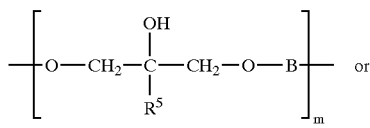
III (4) hydroxy-functionalized poly(ether sulfonamides) having repeating units represented by the formula:

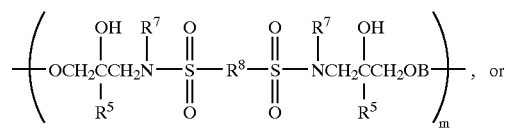
IVa

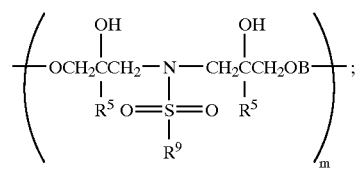
IVb wherein $R^1$ is a divalent organic moiety, which is primarily hydrocarbon; $R^2$ is independently a divalent organic moiety, which is primarily hydrocarbon; $R^3$ is

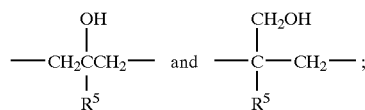

$R^4$ is

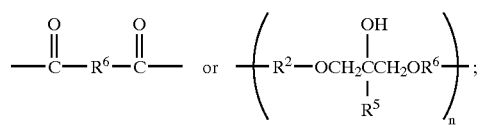

$R^5$ is hydrogen or alkyl; $R^6$ is a divalent organic moiety, which is primarily hydrocarbon; $R^7$ and $R^9$ are independently alkyl, substituted alkyl, aryl, substituted aryl; $R^8$ is a divalent organic moiety, which is primarily hydrocarbon; A is an amine moiety or a combination of different amine moieties; B is a divalent organic moiety, which is primarily hydrocarbon; m is an integer from 5 to 1000; and n is an integer from 0 to 100.

9. The concrete article of claim 8 wherein the fiber is a side-by-side bicomponent fiber, a sheath-core bicomponent fiber, a segmented-pie bicomponent fiber or an islands-in-the-sea bicomponent fiber.

10. The concrete article of claim 9 wherein the fiber is a sheath-core fiber comprised of a sheath of the thermoplastic hydroxy-functionalized polyether or polyester and a core of a thermoplastic polymer other than a hydroxy-functionalized polyether or polyester.

11. The concrete article of claim 1 wherein the concrete article is a shotcrete formed article.

12. The concrete article of claim 6 wherein the fiber has a cylindrical, cross-shaped, trilobal or ribbon shaped cross-section.

13. The concrete article of claim 8 wherein the bicomponent fiber has a cylindrical, cross-shaped, trilobal or ribbon shaped cross-section.

14. The concrete article of claim 6 wherein the fiber is formed by melt-spinning, dry-spinning or wet-spinning of a polymer solution.

15. The concrete article of claim 1 wherein the reinforcing polymer is present in an amount from about 0.01 percent to about 3 percent by volume of the concrete article.

16. The concrete article of claim 15 wherein the reinforcing polymer is present in an amount from about 0.025 percent to about 1.0 percent by volume of the concrete article.

17. The concrete article of claim 8 wherein the polyolefin is a polypropylene or a grafted polypropylene.

18. The concrete article of claim 17 wherein the polyolefin is polypropylene.

19. The concrete article of claim 8 wherein the thermoplastic hydroxy-functionalized polyether or polyester is poly (hydroxy amino ether) of the reaction of the diglycidyl ether of bisphenol A and ethanolamine.

20. A process to make concrete comprised of mixing concrete, water and a reinforcing organic polymer fiber, sheet or ribbon that has a surface comprised of a thermoplastic hydroxy-functionalized polyether or polyester wherein the reinforcing polymer is comprised of a blend of the hydroxy-functionalized polyether or polyester with a polyolefin, polyester, polyamide, polysaccharide, modified polysaccharide, naturally-occurring fiber, particulate filler, thermoplastic polyurethane, thermoplastic elastomer, glycol-modified copolyester (PETG) of combination thereof and curing said concrete mixture to form the concrete article.

21. A concrete article formed by the process of claim 20.

22. The process of claim 20 wherein the reinforcing polymer is a fiber.

23. The process of claim 20 wherein a polymeric emulsion of styrene-butadiene, epoxy, polyurethane, and ethylene-styrene is added to the concrete.

24. A concrete article comprised of concrete having therein a reinforcing polymer that is a fiber, sheet or ribbon or combination thereof and said reinforcing polymer has a surface comprised of a thermoplastic hydroxy-functionalized polyether or polyester wherein the reinforcing polymer is comprised of a blend of the hydroxy-functionalized polyether or polyester with a polyolefin, polyester, polyamide, polysaccharide, modified polysaccharide, naturally-occurring fiber, particulate filler, thermoplastic polyurethane, thermoplastic elastomer, glycol-modified copolyester (PETG) or combination thereof and concrete article has a compressive strength that is equal to or greater than a concrete of the same composition without said reinforcing polymer.

* * * * *